United States Patent [19]

Eizenhöfer et al.

[11] Patent Number: 4,850,033
[45] Date of Patent: Jul. 18, 1989

[54] METHOD OF AND CONTROL ARRANGEMENT FOR SELECTING A CONTROL CHANNEL BY A MOBILE RADIO STATION

[75] Inventors: Alfons Eizenhöfer, Altdorf; Werner Schmidt, Roscommon, Ireland

[73] Assignee: U.S. Philips Corp., New York, N.Y.

[21] Appl. No.: 32,416

[22] Filed: Mar. 30, 1987

[30] Foreign Application Priority Data

Apr. 4, 1986 [DE] Fed. Rep. of Germany ....... 3611301

[51] Int. Cl.$^4$ ............................ H04B 2/00; H04B 7/00
[52] U.S. Cl. ......................................... 455/56; 455/33; 455/34; 455/54
[58] Field of Search ................... 455/56, 54, 34, 33

[56] References Cited

U.S. PATENT DOCUMENTS

| | | | |
|---|---|---|---|
| 4,527,284 | 7/1985 | Rottger | 455/33 |
| 4,551,852 | 11/1985 | Graul et al. | 455/33 |
| 4,573,206 | 2/1986 | Graul et al. | 455/56 |
| 4,633,509 | 12/1986 | Scheinert | 455/33 |
| 4,635,285 | 1/1987 | Coombes | 455/33 |
| 4,638,479 | 1/1987 | Alexis | 455/56 |

FOREIGN PATENT DOCUMENTS 0111972  6/1984  .

Primary Examiner—John W. Caldwell, Sr.
Assistant Examiner—Tyrone Queen
Attorney, Agent, or Firm—Thomas A. Briody; Algy Tamoshunas; Leroy Eason

[57] ABSTRACT

In prior cellular radio transmission systems a base radio station (BS) periodically transmits references identifying control channels associated with such base radio station, references identifying control channels of adjoining base stations, and references identifying a substitute control channel. The invention reduces the number of references which must be transmitted by a base station, which is of particular advantage in an integrated services cellular radio transmission system. A transmission channel of each base station is assigned as a simplex message transmission channel (COCH) in which a given base station (BS) transmits to the mobile stations (MS) information describing the structure of the control channels (CCH). Such information includes references (NC) to message transmission channels of adjoining base stations and references (CC) to one or more control channels assigned to the given base station. Since the message transmission channels are at a higher level in the hierarchy of references than the control channels, access by several different kinds of subscriber sets and different services can be provided by transmitting a relatively small number of references.

8 Claims, 2 Drawing Sheets

METHOD OF AND CONTROL ARRANGEMENT FOR SELECTING A CONTROL CHANNEL BY A MOBILE RADIO STATION

BACKGROUND OF THE INVENTION

1. Field of the Invention

The invention relates to a method of selecting a control channel by a mobile station in a cellular radio system.

2. Description of the Related Art

Prior art radio transmission systems include base radio stations which in a spatial arrangement form a cellular system with overlapping radio zones. The radius of such a radio zone is between 2 and 30 kilometres, depending on the height of the aerials of base stations and the transmission power. Each radio zone is supplied by a base radio station. This station can convey conversations via what are commonly known as radio exchanges from and to the public telephone network. A plurality of adjacent radio zones can be combined into a so-called call area. At the base station end, the whereabouts of all the mobile radio stations are collected and stored in what is commonly known as an address book. If a mobile radio station moves into another call area, then the address book is updated.

Depending on the volume of traffic, a number of speech channels and always at least one control channel are assigned to the base radio stations of each radio zone of the radio transmission system. In geographically adjoining radio zones different frequencies, spread codes or time channels can be used for different control channels. To distinguish between control channels and speech channels each of these channels is characterized by a special code. If a control channel fails or is subject to interference, any speech channel can take over the functions of the control channel by a change in code.

The search of a mobile station for a control channel can take a very long time, when the radio transmission system has a plurality of transmission channels (control channels and speech channels).

The published European patent application EP-A No. 2-0 111 972 discloses a method of selecting a control channel by a mobile radio station in which long search tuning times are avoided for at any optional arrangement of control channels in the frequency band of the transmission channels. In accordance with this known method, the base radio station transmits at variable time intervals references to the control channels of adjacent base radio stations, references to a substitute channel assigned to the base radio station and references to the control channel itself. If several control channels are assigned to the base radio station, then the base radio station also transmits references to these channels, it being possible that al the transmitted references contain in addition to the control channel number also additional information, such as, for example, country code and/or a subset code and/or a call area code.

In addition, the DE-OS No. 32 00 965, which corresponds to U.S. Pat. No. 4,527,284, describes a neighbouring radio cell-control channel-reference system, in which, when the control channels have free transmission capacities, references to control channels of adjoining radio cells are transmitted. The content of the references is the control channel frequency used, and the mobile radio station performs level comparison tests on the indicated control channel frequency at different time intervals.

An exchange of references between the base radio stations is necessary for monitoring the state of the network. If a given base radio station has, for example, five adjoining base radio stations, then each of these adjacent base radio stations must be informed of the failure of a control channel of the given station and of a switch to a substitute control channel assigned to such station.

In an integrated services radio transmission system there are few services which must usually be available everywhere. The total overall bandwidth available in the integrated services radio transmission system is always divided as regards time and areas (geographical frequency repetition) on the basis of the actual requirements of that moment. The base stations comprise only those arrangements for different services which for the relevant radio zones the subscribers are in need of. The cost of an integrated services radio transmission system is basically determined by the functions which are at least required for accessing the system and the arrangements required for performing the different services in correspondence with the different subscribers sets. These various subscribers sets may, for example, consist of:

a simple radio receiver with alphanumerical display;

a "pocket telephone" with a receiving and a transmitting frequency for use in a limited geographical area and with limited service quality;

a "dispatch device" (in the "dispatch service" a common radio transmission channel is used in the direction from the base station to the vehicles of a group of vehicles, whilst in the return direction each vehicle can acces its own radio transmission channel) with a receiving and a small number of transmission frequencies for half-duplex operation;

a "portable" with several receiving and transmission frequencies for duplex operation and country-wide supply, which is also suitable for use in vehicles, a mobile data terminal with half-duplex transmission in a packet-switching method having a low data rate;

a "mobile office" (for example for building sites, banks etc.) with transparent duplex transmission of 64 kbit/s, which is only operated in the stationary state etc..

If in the radio transmission system different types of subscriber sets and different services are performed and if also different control channels are provided for the different services, then the references for all the different control channels must be exchanged between the base radio stations. If, for example, four different services are provided in the radio transmission system—for example a speech service, a low-bit rate data service, a data service with a high bit rate etc.—then the above example requires 20 control channel references to be transmitted between the neighbouring radiostations.

SUMMARY OF THE INVENTION

The invention has for its object to provide in an integrated services radio transmission system, a method of selecting a control channel by the mobile radio stations, in which the number of control channel references to be checked is minimized.

In a method according to the invention the message transmission channel for providing information about the structure of the control channels is a simplex transmission channel which, in a manner similar to that of a speech channel, is transmitted by the base radio station. The message transmission channel informs the mobile radio stations about the configuration (arrangement) of the control channels in the integrated services radio transmission system. Consequently, in the system hierarchy, the message transmission channel is arranged above the control channels. It is then only necessary for a mobile radio station seeking to gain access to the network to investigate the small number of different message transmission channels in the total overall frequency band of the integrated services radio transmission system.

The method of the invention can also be used in a digital radio transmission system, in which a different modulation method is always used in the forward and return directions of the radio transmission channels. In the direction from the base radio station to its associated mobile radio station (forward direction) each transmission channel is distributed by spread spectrum modulation. The distributed radio transmission channels thus formed are superimposed on each other in the base radio station and the resultant broadband sum signal is transmitted in a common frequency band. In the direction from the mobile radio stations to the base radio station (return direction) the message transmission is effected in narrow-band transmission channels which are separate from each other.

Each base station has a set of channels, consisting, for example, of 32 transmission channels. The individual transmission channels of a channel set can be separated from each other by, for example, code-division multiple access using different spread code words (CDMA), and/or by different time-division multiplex access channels (TDMA). The different time-division channels are combined, for example, in a time-division multiplex frame always having four time-channels, and subsequent thereto each time-division multiplex frame so formed is spread, using appropriately selected code words, by means of which it is possible to transmit a plurality of time-division multiplex frames simultaneously and with the same carrier frequency. If, for example, 8 different code words are used for each set of channels, the set of channels then contains 8 different time-division multiplex frames each having four time channels, consequently a total of 32 transmission channels per set of channels.

In such a digital radio transmission system with, for example, 20 different carrier frequencies, only a search for that carrier frequency having the highest amplitude is required in the mobile radio station after switch-on, which determines the radio cell and the flow of messages which must be searched to find the control channel references. Thus, access of the mobile radio station to the network is enabled in a simple way and manner and only a small number of references are to be checked.

The control arrangement for performing the method both in the base station and also in the mobile stations requires only a low additional cost and design effort, as arrangements already present can be co-utilized.

BRIEF DESCRIPTION OF THE DRAWINGS

The invention will now described in greater detail with reference to an embodiment shown in the accompanying drawings. Therein.

DESCRIPTION OF THE PREFERRED EMBODIMENTS

In the radio transmission system base radio stations BS are geogrphically arranged in accordance with a cellular system. A plurality of transmission channels are assigned to each base radio station BS, one of these transmission channels (the control channel) being used for signalling purposes for controlling the system functions. These functions include, for example, the transmission of dialing information during the set-up of calls to the different subscribers set or mobile radio stations MS, respectively.

In the radio transmission system different types of subscribers sets and different services can be operated. Each base radio station BS has assigned to it at least one control channel CCH and also a message transmission channel COCH which is a simplex message transmission channel, which is operated in a manner similar to that of a radio transmission channel. References NC identifying message transmission channels COCH of adjacent base stations BS are transmitted via the message transmission channel COCH of a given station. In addition, at least one reference CC to a control channel assigned to the given base station BS is transmitted via its message transmission channel COCH. The respective references NC and CC include at least the addresses (i.e. frequency, time or code) assigned to the message transmission channels COCH and the control channels CCH, respectively. Furthermore, the base station BS transmits at variable time intervals via the message transmission channel COCH references MR to this channel itself, the reference MR identifying the message transmission channel as such. Finally, at variable time intervals, the base station BS transmits via the message transmission channel COCH a reference SC to a substitute channel COCH-SC assigned to it, the contents of the reference SC also being the address of the substitute channel COCH-SC. In the referencs NC, SC, MR and CC an encoded message for a country code and/or a group marking and/or a call zone marking and/or service category marking and/or call chargeinformation and/or system operator codes can be transmitted.

In a radio transmission system with variable channel assignment for the forward and return directions by the base station BS, the control channel reference CC transmitted in the message transmission channel COCH only relates to the forward direction (downlink) of the control channel CCH, and in the control channel thus determined a reference to a control channel CCH in the return direction (uplink, that is to say in the direction from the mobile station MS to the base station BS), is transmitted.

Figure 1A:
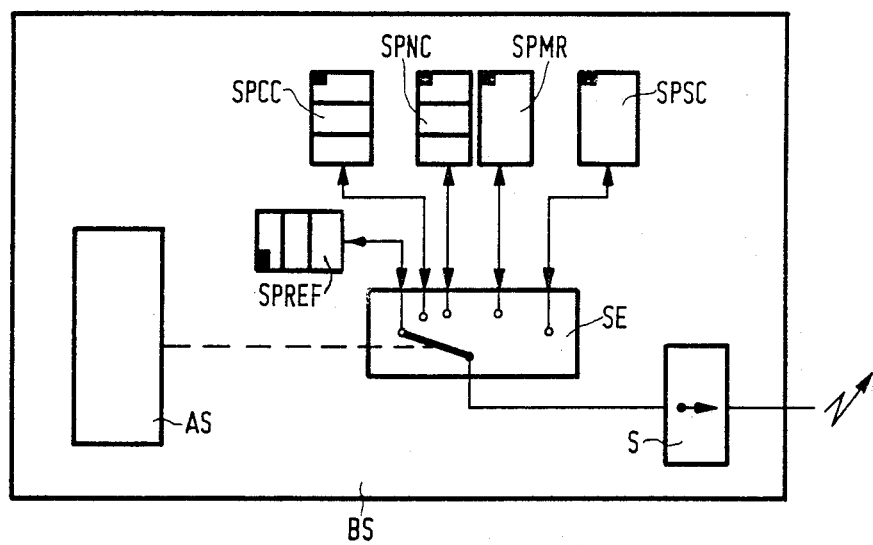
FIGS. 1A and 1B are block circuit diagrams of the control arrangement in the base radio station and the mobile radio station, respectively.
Figure 1B:
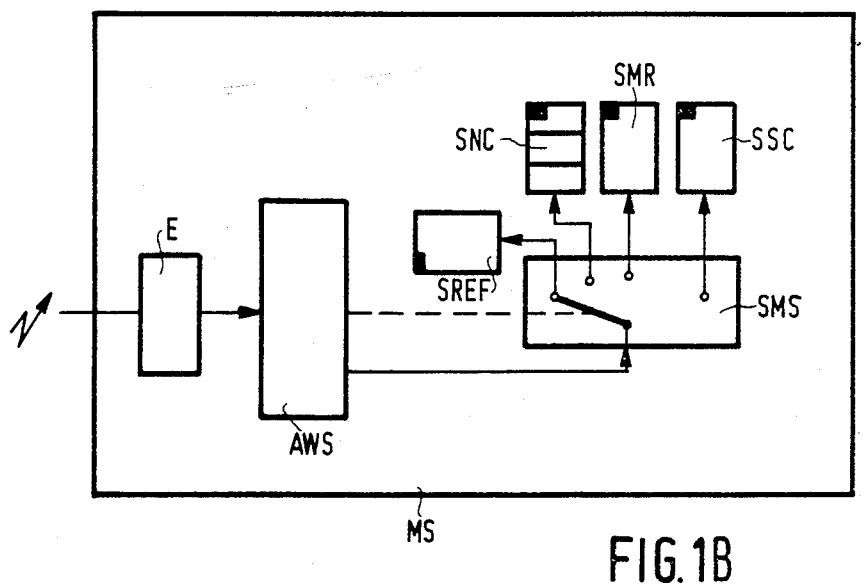

FIGS. 1A and 1B are block circuit diagrams of the control arrangement in a base station (BS) and a mobile station MS, respectively. The base station BS has a selection circuit AS which is connected to a switching circuit arrangement SE and controls the change-over operation of the switching arrangement SE. A control device (microprocessor) included in the base station BS can be used as the selection circuit AS in addition to its other uses. A plurality of stores are connected to the switching arrangement SE and under the control of the selection circuit AS the contents of these several stores are read and applied to the transmitter S included in the base station BS. The reference MR of the message transmission channel COCH, which refers to itself, is stored in a store SPMR. The reference SC to a substitute channel COCH-SC assigned to the message transmission channel COCH is stored in a store SPSC. The references NC to message transmission channels COCH of neighbouring base stations BS are stored in a store SPNC and the references CC to the control channels CCH assigned to the base station BS are stored in a store SPCC. References REF to control channels CCH of the return direction (uplink) are stored in a store SPREF. These references REF are transmitted through the associated control channels CCH of the forward direction (downlink).

At variable time intervals the references CC, NC, SC and MR are transmitted by the base station BS and received in a receiver E of the mobile radio station MS. After having been decoded and demodulated, the references CC, NC, MR and SC are applied to a selection circuit AWS which is connected to the receiver E and itself is connected to and controls a switching circuit arrangement SMS. Connected to the switching arrangement SMS are a store SNC for storing the references NC to message transmission channels COCH of neighbouring base stations BS, a store SMR for storing the references MR of the message transmission channel COCH which refer to itself and a store SSC for storing the references SC to a substitute channel COCH-SC assigned to the message transmission channel COCH. The reference REF to the associated control channel CCH of the return direction, which is transmitted in the control channel CCH of the forward direction is stored in a store SREF.

On switch-on of the mobile station MS or when there is no agreement between the content of the reference MR of the message transmission channel CCH and the reference MR stored therein, the mobile station MS starts a search procedure for the reference MR message transmission channel, selects from the control channel references CC transmitted on such message transmission channel an appropriate control channel, and switches to this apropriate control channel CCH. The instantaneous network structure thus obtained is stored in the stores SNC, SMR and SSC.

Figure 2:
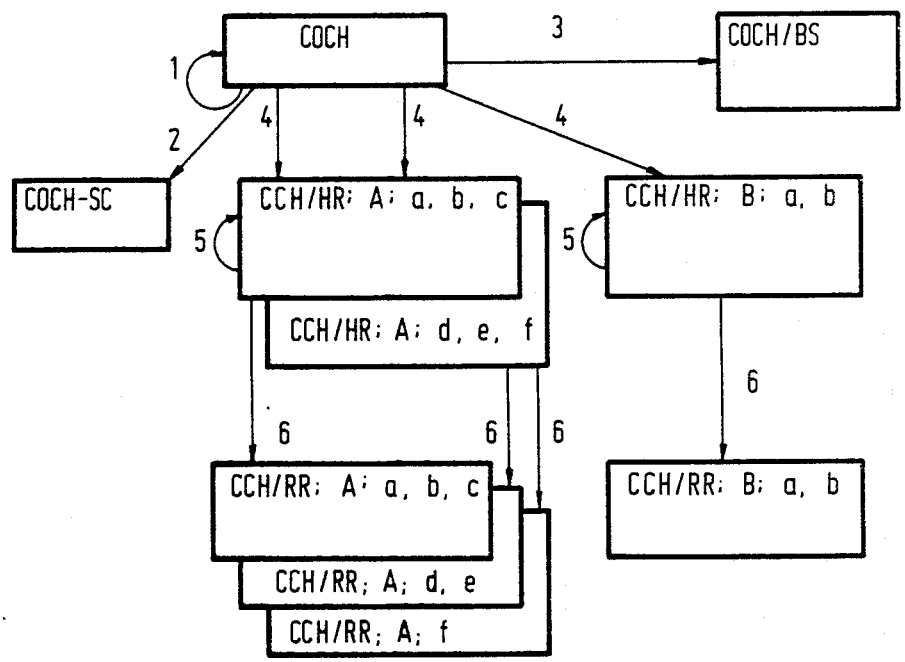
FIG. 2 shows the logic structure and allocation of the different control channel references in the method according to the invention.

FIG. 2 illustrates the logic structure of the references and how they are assigned to each other. The various boxes of this structure have the following meanings:

| Abbreviated Description | Meaning |
| --- | --- |
| COCH/BS | COCH of an adjacent BS |
| CCH/HR;A;a,b,c | CCH forward direction; Service A; subgroups a,b,c. |
| CCH/HR;B;a,b | CCH forward direction; Service B subgroups a,b. |
| CCH/HR;A;d,e,f | CCH forward direction; Service A; subgroups d,e,f. |
| CCH/RR;A;a,b,c, | CCH return direction; Service A; subgroups a,b,c. |
| CCH/RR;A;d,e | CCH return direction; Service A; subgroups d,e. |
| CCH/RR;A;f | CCH return direction; Service A; subgroup f. |
| CCH/RR;B;a,b | CCH return direction; Service B; subgroup a,b. |

In an integrated services radio transmission system different control channels (designated by A and B in FIG. 2) for the different services and the total number of the mobile stations present in the area covered by the base station BS can be sub-divided into sub-groups a to f. Only on this level, which as regards system hierarchy is a lower level, of the control channels CCH, references (CCH-marker, REF) are transmitted via the control channels CCH assigned to the base station BS, whilst the references NC to the base stations BS adjcaent to the base radio station BS are processed in a higher system level.

The following Table explains that—for a channel assignment for the forward and return directions which can be changed by the base station BS—the reference CC is transmitted in the forward direction via the message transmission channel COCH, whereas the reference REF for the channel assigned to this control channel CCH is transmitted in the return direction via the relevant control channel CCH.

|   | Reference | is transmitted in | refers to |
| --- | --- | --- | --- |
| 1 | MR | COCH | COCH |
| 2 | SC | COCH | COCH-SC |
| 3 | NC | COCH | adjacent COCH |
| 4 | CC | COCH | CCH forward direction |
| 5 | CCH-marker | CCH | CCH forward direction |
| 6 | REF | CCH | CCH return direction |

It is also possible to transmit a reference (CCH-marker) to the control channel CCH itself via this control channel CCH. This reference has for its object to check the switching procedure effected by the mobile station BS from the message transmission channel COCH to the control channel CCH. This reference increases the reliability of the switching procedure and is not an absolute prerequisite for operating the system.

What is claimed is:

1. In a cellular mobile radio system comprising a plurality of base stations and mobile stations, each base station having a plurality of transmission channels assigned to it of which at least one is a control channel, each base station transmitting to the mobile stations references identifying the addresses of control channels of such base station and those of adjoining base stations so as to enable the mobile stations to select a control channel of a base station; a method of minimizing the number of references required to be transmitted by each of the base stations in order to enable a mobile station to select a control channel, such method comprising:

assigning a transmission channel of each base station (BS) for use as a simplex message transmission channel (COCH) which is identified by an address reference (MR);

periodic transmission by each base station (BS) in its message transmission channel of references (NC) identifying the addresses of message transmission channels of adjacent base stations;

periodic transmission by each base station (BS) in its message transmission channel of references (CC) identifying the addresses of control channels of such base station (BS): and transmission at variable time intervals by each base station (BS), in its message transmission channel, of a reference (MR) identifying the address of such message transmission channel.

2. A method as claimed in claim 1, further comprising assigning a transmission channel of each base station (BS) for use as a substitute simplex message transmission channel (COCH-SC), and transmission at variable time intervals by each base station (BS) in its message transmission channel of a reference (SC) identifying the address of such substitute message transmission channel.

3. A method as claimed in claim 2, wherein in addition to an address each of said references (NC, CC, MR, SC) includes an encoded message identifying one or more of a country code, group marking, call zone, service category, call charge information, and system operator code.

4. A method as claimed in claim 1, further characterized in that upon switching-on of a mobile station (MS) or upon non-agreement of the content of a reference (MR) stored therein with a reference (MR) received from a base station, the mobile station selects a control channel from the control channel references (CC) identified in the message transmission channel identified by the received reference (MR).

5. A method as claimed in claim 1, further characterized in that said transmission channels are separated by one or more of frequency-division multiplexing, time-division multiplexing and code-division multiplexing; and the message transmission channel and a control channel of base stations having relatively low traffic loads are transmitted alternately in the same transmission channel.

6. A method as claimed in claim 1, wherein a base station (BS) changes a control channel assigned thereto depending on whether communication is being effected in the forward or return direction with a mobile station (MS), the reference (CC) identifying a given control channel of such base station (BS) being transmitted in the message transmission channel of such base station only for use in the forward direction to such mobile station, and a reference (REF) identifying another control channel of such base station (BS) being transmitted by the base station in the message transmission channel for use in the return direction from such mobile station.

7. A base radio station for use in a cellular mobile radio system comprising a plurality of base stations and mobile stations, each base station having a plurality of transmission channels assigned to it of which at least one is a control channel (CCH) identified by an address reference (CC) and one is a message transmission channel (COCH) identified by an address reference (MR), each base station (BS) transmitting to the mobile stations references (NC) identifying the addresses of message transmission channels of adjacent base stations; said base station (BS) comprising:
 a store (SPNC) for said references (NC) to message transmission channels of adjacent base stations;
 a store (SPCC) for references (CC) to control channels of said base station (BS);
 a store (SPMR) for references (MR) to the message transmission channel of said base station (BS);
 a switching circuit and a transmitter connected thereto, said switching circuit being controllable to selectively couple each of said stores to said transmitter; and
 a selection circuit (AS) for controlling said switching circuit to selectively supply said references (NC, CC, MR) to said transmitter.

8. A mobile radio station (MS) for use in a cellular mobile radio system comprising a plurality of base stations and mobile stations; each base station having a plurality of transmission channels assigned to it of which at least one is a control channel (CCH) identified by an address reference (CC) and one is a message transmission channel (COCH) identified by an address reference (MR); each base station (BS) transmitting to the mobile stations references (NC) to message transmission channels of adjacent base stations, references (CC) to control channels of the base station (BS), and a reference (MR) to the message transmission channel of the base station (BS); said mobile station (MS) comprising:
 a receiver for receiving, decoding and demodulating references (NC, CC, MR) received by the mobile station;
 a switching circuit (SMS) having an input and a plurality of outputs, said switching circuit being controllable to selectively connect said input to any of the respective outputs;
 a plurality of stores respectively connected to the respective outputs of said switching circuit; and
 a selection circuit (AWS) connecting said receiver to the input of said switching circuit to supply the received references (NC, CC, MR) thereto, said selection circuit controlling said switching circuit to store respective received references in respective ones of said stores.

* * * * *